Feb. 15, 1938.  E. E. TURNER, JR  2,108,089
RECORDING DEVICE
Filed Sept. 4, 1931   3 Sheets-Sheet 1

Inventor
Edwin E. Turner
Per Ezekiel Wolf
Attorney

Feb. 15, 1938.     E. E. TURNER, JR     2,108,089
RECORDING DEVICE
Filed Sept. 4, 1931     3 Sheets-Sheet 2
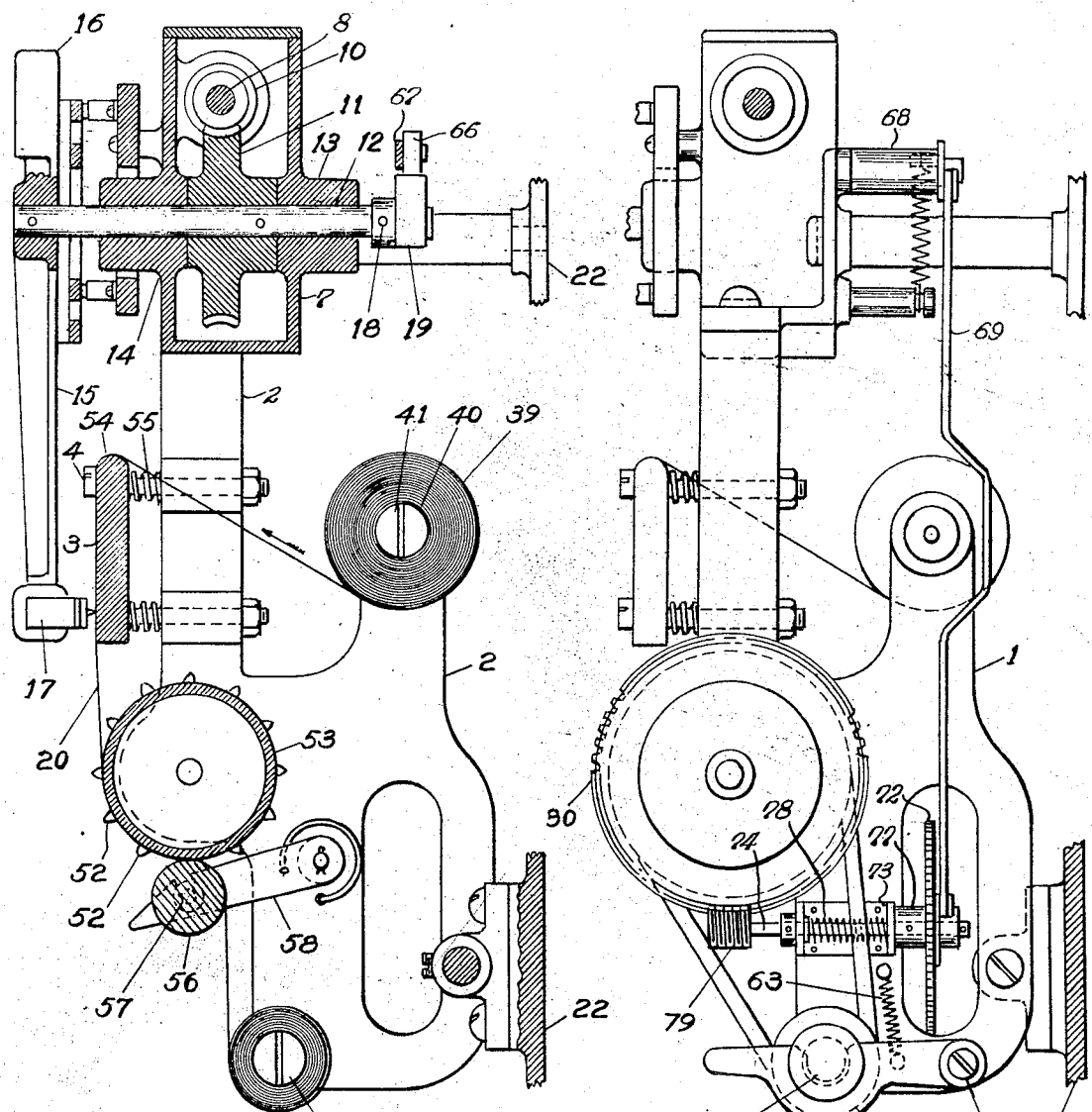
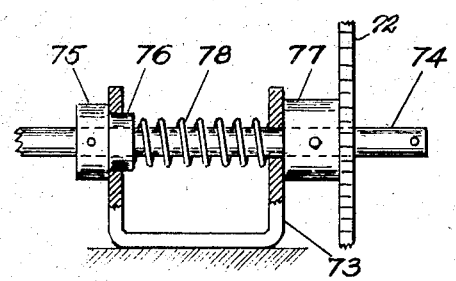
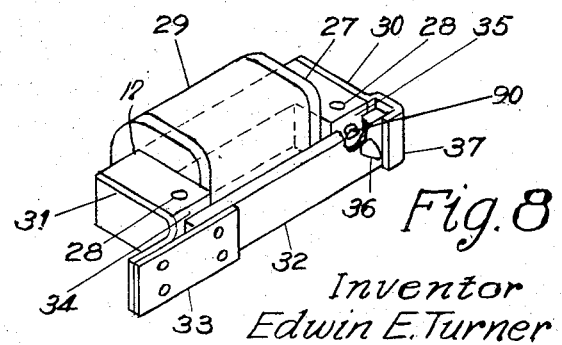
Inventor
Edwin E. Turner
Per Ezekiel Wolf
Attorney Feb. 15, 1938.   E. E. TURNER, JR   2,108,089
RECORDING DEVICE
Filed Sept. 4, 1931   3 Sheets-Sheet 3

Inventor
Edwin E. Turner
Per Ezekiel Wolf
Attorney

Patented Feb. 15, 1938

2,108,089

UNITED STATES PATENT OFFICE 2,108,089

RECORDING DEVICE

Edwin E. Turner, Jr., West Roxbury, Mass., assignor to Submarine Signal Company, Boston, Mass., a corporation of Maine Application September 4, 1931, Serial No. 561,213

3 Claims. (Cl. 234—72)

The present invention relates to a system for recording the receipt of signals, and more particularly, to such a system which may be used for measuring short time intervals or distances, as in determining heights of aircraft from the ground or the depth of water beneath a vessel by the use of the so-called time of travel method.

In the use of a recording device for finding depths and distances, in water or in air, a signal is sent out and the time interval between the transmission of the signal and the receipt of the reflected echo from the object whose distance is to be measured is recorded.

Most recording systems either employ means for producing an electrical discharge through a recording paper or providing a stylus, which makes a continuous mark upon a recording paper and which, at the moment of the receipt of the signal indicating the measurement of the time interval or distance, produces a serration.

These systems while operative are sometimes quite sluggish and do not produce accurate records. Besides this, the device for producing the continuous mark is apt to be rather large and clumsy, and cannot easily be rotated or moved.

Such is the difficulty with the galvonometer type of recorder which has been used at times for this work. The difficulty with discharging a spark through a paper is that the spark cannot easily be controlled, and there is a tendency for the spark to jump through the paper at the same place for a considerable time until that spot is so far away from the electrodes that it is easier to jump through a new spot. The recording by means of a discharge produces, therefore, a somewhat irregular chart or recording line.

A moistened paper has also been used for recording purposes, but this is inconvenient for the average person to handle as the paper must be properly moistened and if moistened too much may tear as the stylus moves over it.

In the device disclosed in the present application, instead of marking the paper continuously, as is usually done, a recording magnet is provided which, normally, continually has its armature retracted from the paper and which, at the moment of receipt of the signal, is released so that the armature may move to mark the paper. In this way only a small mark is produced on the paper when the signal is received. The electromagnet of the recording magnet is preferably placed in the plate circuit of a thermionic tube and the plate current of the tube is normally used to hold the armature of the magnet in a position away from the paper against the tension of a spring.

The recording magnet is continually rotated over the surface of the paper but the stylus on the armature is so adjusted that it just does not touch the surface of the paper. When a signal is received, and the armature momentarily released, the stylus produces a mark on the surface of the paper. Upon the establishing of the plate current the armature is again retracted from the paper and, in this fashion, a short mark is produced as the recording armature travels over the surface of the paper.

The paper is preferably a wax paper, having a base coloring different from the coloring of the wax so that when the wax is removed by the marking of the stylus on it the color beneath will show.

Without describing further details of the system, an embodiment of the invention will be described in connection with the drawings illustrating the same, in which:

Figure 2 shows a side view;

Figure 3 shows a section;

Figures 1, 4, 5, 6:
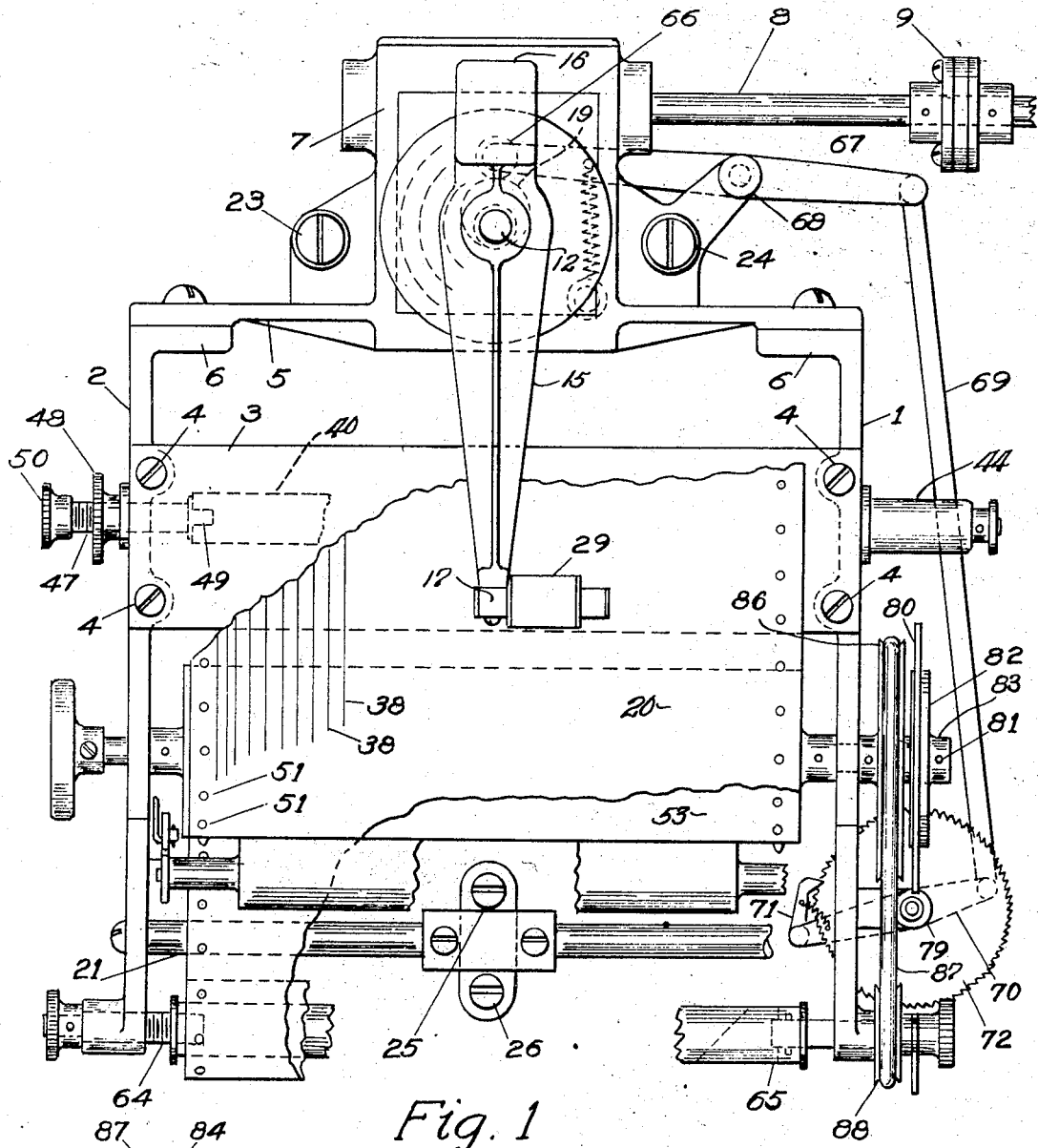
Figure 1 shows a front view of the recording device.
Figure 4 shows a detail of the paper driving machinery.
Figure 9:
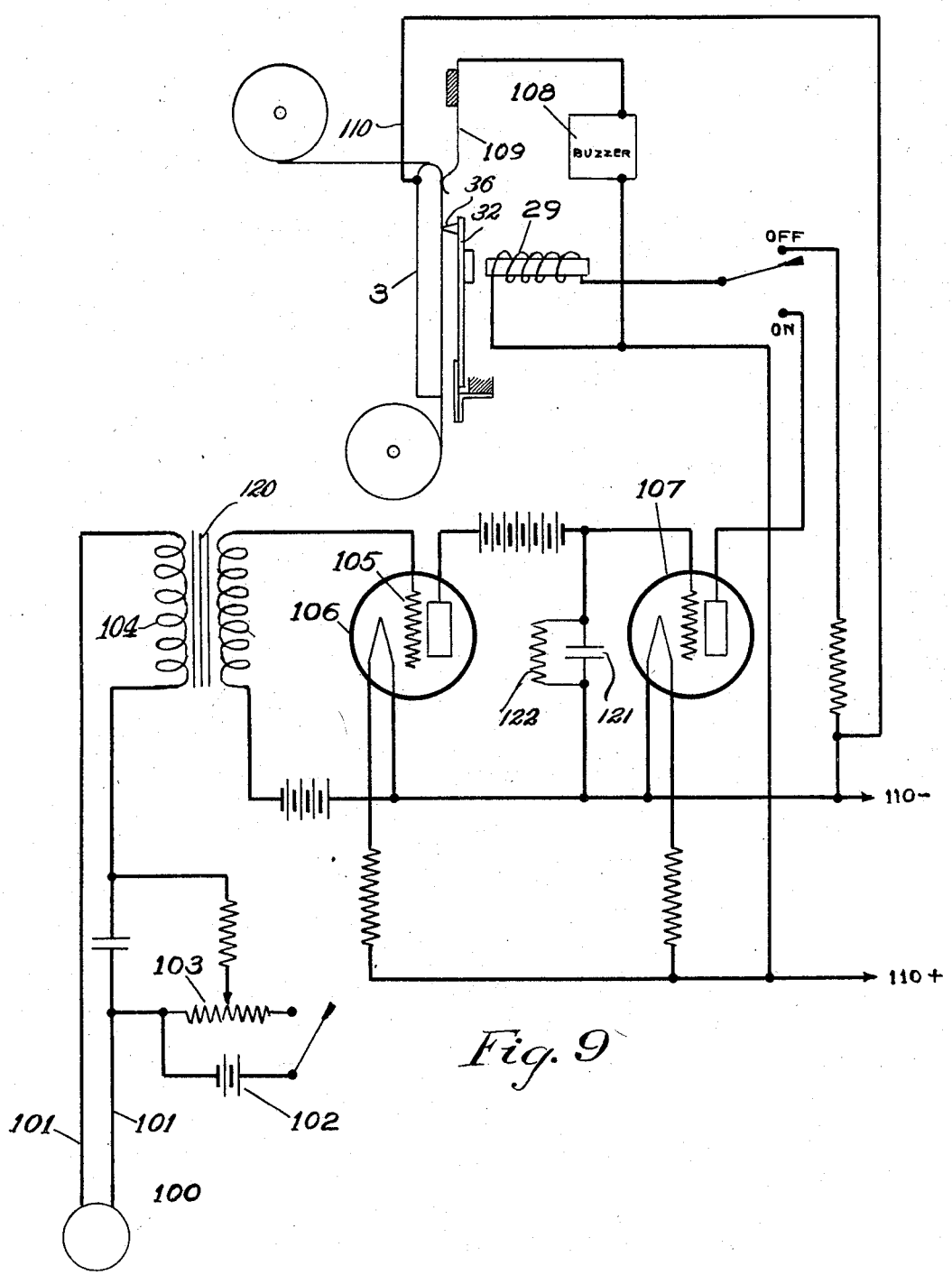

Figures 5, 6, and 7 show further details of the paper driving mechanism;

Figure 8 shows a detail of the means for producing the mark on the recording paper;

Figure 9 shows the electrical connections of the circuit, including the receiving elements; and Figure 10 shows partly diagrammatically the synchronization of the system for producing a wave impulse at the proper position of the recording arm.

As shown in Figure 1 there are provided two side frames 1 and 2 which are held together by a rod 21 to which the frames are screwed and by a top piece 5 screwed to the frames 1 and 2 in the inwardly extending flanges 6. Upon the top plate 5 is mounted a gear box 7 which has a shaft 8 extending through the right side wall, as seen in Figure 1.

This shaft 8, which is the prime driving shaft for the whole mechanism, is coupled by means of the coupling 9 to a driving motor which, in depth sounding or distance measurement, is so driven that the sound or energy impulse is given out when the indicator of the recorder is at zero. This mechanism is shown in Figure 10. The recording arm 15 may be continuously rotated by means of the motor 150 driving the shaft 8.

At a position of the arm 15 at one side of the recording paper at which the scale markings on the paper begin and which, therefore, may be called the zero position as measuring a zero depth, a sound or other impulse may be emitted by the transmitter 160. The circuit 159 is at this point closed by completing an electrical contact between the contact elements 156 and 157 mounted on the switch block 158, thus applying the power source 155 to the sound producer. If the sound producer 160 is of the impact type, the circuit may be arranged in such a manner that the impact element is released by the operation of the switch contacts. As indicated in Figure 10 the contacts 156 and 157 are closed through the projection 154 on the cam 153 which is driven through the gear box 152 through the shaft 151 of the motor 150. The paper 20, as indicated in Figure 10, is fed so slowly that successive recordings 161 on the paper by each cycle of the arm 15 produce a continuous contour indicating the depth. In the operation of the system shown in Figure 10 the sound is emitted at some position such as 162 which may be, as is stated above, the zero position on the recording paper. In the time that the arm 15 travels to the point where a record is produced the sound or other compressional wave will have travelled to its reflecting surface and have returned, whereupon it affects the receiving system, shown in Figure 9, to operate the armature of the recording magnet 29. This arrangement is in principle that shown in Figure 1 of my United States Patent No. 2,033,160, issued March 10, 1936, in which the driving motor is 35, the sound producer 46, the cam 43, the contacts 44 and 45, and the gear reduction system comprising the elements 37, 38, 39, and 40.

The sound impulse in soundings, when using an impact oscillator, is given out periodically so that the recording device will read directly.

If desired, the recording device itself may be provided with the proper cams as shown in the United States Patent No. 2,033,160, mentioned above, to control the operation of the impact oscillator but it is more usual to use a recording device and a visual indicating device together and to let one control the operation of the sounding mechanism for both measuring devices. The shaft 8 in the box 7 drives a worm 10, shown in section in Figure 3, and the worm drives a gear 11 which rotates the shaft 12 mounted on the bearings 13 and 14 in the gear box.

At the left end of the shaft 12, as shown in Figure 3, is attached an arm 15 having a counter weight 16 at its upper end, as indicated in Figure 3, and a recording element 17 at its lower end which will be described in detail later. The shaft 12 at the rear has pinned to it by a set screw 18 a cam 19 which controls and operates the entire feeding mechanism for operating the advance of the recording paper 20 in the desired time.

The entire recording device is mounted in a casing, fragments of which are shown in Figures 2 and 3, as 22, 22 by means of the bolts 23, 24, 25, and 26.

The motor speed driving the shaft 8 is such that the arm carrying the recording mechanism rotates about one revolution a second. This speed may be decreased if desired so that only twelve or twenty four records are made per minute.

The recording element is shown in detail in Figure 8 and comprises a U shaped magnetic core 27, made up of a group of U shaped laminations and pinned together by the pins 28, 28. About the core is wound a coil 29 of sufficient impedance to match or nearly match the impedance of the electrical circuit operating it; that is to say, the coil 29 of the magnet is made to have the same electrical impedance as the rest of the circuit, as indicated in Figure 9, which includes the vacuum tube 107 and the other elements of the circuit as measured from the points at which the coil is connected. At each end of the U shaped core are plates 30 and 31, the plate 30 forming a guard about the armature 32, and the plate 31 extending angularly and having a thin spring strip 33 riveted thereto. The armature 32 is riveted to this thin strip. The armature is spaced from both poles 34 and 35 of the U shaped core and has on its outer surface a marking point or stylus 36 extending slightly beyond the guard element 37. The pole 35 has a small projecting non-magnetic element 90 to allow rapid collapse of the magnetic circuit and release of the armature upon operation by the signal.

Normally the armature 32 is attracted to the poles since electric current is flowing in the plate circuit of tube 107, thus energizing the magnet 29 which holds the armature against the force of the spring 33. The armature is substantially positioned in a plane parallel to the plane of the recording paper at the point of recording, as shown in Figure 3; and, in fact, the armature is always in this same plane because of the motion of the arm 15 in a plane parallel to the plate 3 and because of the position of the armature 32 which is substantially parallel to the plate 3 whether held in a retracted position or released.

The recording paper 20 which, as shown in Figure 1, is calibrated by the lines 38, may be calibrated in units of distance or depth for height or distance measurement. The recording paper is fed from a roll 39, mounted in bearings on both sides of the frames 1 and 2 so that the roll may be easily turned. One of the bearings is shown dotted at the left of Figure 1. The roll 39 has a slot 41, at the end of its shaft 40, into which slot the tongue of the shaft 42 fits as indicated in Figure 5. The shaft 42 sets in a sleeve 43 in the frame 1, the sleeve 43 being formed as a cap 44 at the end through which the end of the shaft 42 projects. The shaft 42 is taken down to a smaller diameter within the cap 44 and between the inner shoulder of the larger portion of the shaft and the cap end is a spring 45 to force the shaft 42 to the left, as shown in Figure 5, against the shaft 40 of the roll 39. The shaft 42 is held in by the knurled knob 46 pinned to the end of the shaft beyond the cap. The bearing at the left end of the roll, as seen in Figure 1, is adjustable so that the roll may be positioned laterally to make the paper 20 feed properly without uneven tension. The adjustment consists of a threaded shaft 47 threading into the collar 48 fixed in the frame 2. The end of the shaft 47 has a small projecting cylindrical rod 49 on which the roll shaft 40 rotates.

The knob 50 on the end of the shaft 47 is turned until the holes 51, 51 etc. are properly aligned over the projecting teeth 52 on the feeding roll 53.

In feeding the paper, the paper first comes from the roll 39, goes upward over the curved top 54 of the plate 3, which is adjustably mounted on the frames 1 and 2 by means of the bolts 4, which have on the further side of the plate 3 springs 55 pressing the plate 3 outward against the bolt heads. From the bottom of the plate 3 the paper goes over the sprocket roll 53, which supplies the power to pull the paper. The sprockets 52 mesh in the holes 51 of the paper and advance it. After passing over a portion of the roll 53, the paper comes between the roll 53 and the roll 56 which sets in a slot 57 in the pivoted arm 58, pivoted to the frame and tensioned to hold the roll 56 against the roll 53. After passing over about one-fourth of the roll 56 the paper proceeds downwards and is wound up on the roll 59.

The roll 59 moves in a slot 60 in the arm 61, pivoted at 62 to the frame 1 on the right. The arm is tensioned and held up by the spring 63. At the left the roll is adjustably held in the frame 2 by the screw threaded shaft 64, Figure 1, which has a small projecting rod fitting in the end of the roll shaft 65. The roll shafts 65 and 40 are the same and when the roll shaft 40 is empty it is transferred down to the bottom and a new roll supplied to the top.

The roll shaft 65 is driven by the same mechanism which pulls the paper but at a slightly greater surface speed than the paper is fed to keep a tension on the paper at all times.

The feed of the paper will now be explained.

Idling on the cam 19 (Figures 1 and 3) is an idler 66, mounted on the arm 67 pivoted at 68 in the top frame 5. At the other end of the arm 67 is a pivoted link member 69 extending downwards. The link 69 is pivoted at its lower end to the pivoted lever 70. The pivoted lever 70 carries at the free end a pawl 71 meshing in the toothed gear wheel 72. Every time the high part of the cam 19 raises the idler 66, it lowers the link 69 and raises the pawl 71 pulling up the toothed gear 72 one or more teeth.

When the pawl drops back the toothed gear remains as it was because of a friction element about to be explained.

Mounted on the frame 1 is a U shaped bracket 73, shown in Figure 7. This U shaped bracket has holes at both sides through which the shaft 74 passes. At the left of the shaft 74 there is pinned a sleeve 75, having a shoulder 76 fitting in the U shaped member. Exterior of the U shaped bracket on the right side the tooth gear 72 is pinned to the shaft in the collar 77, which has a bearing surface on its left face rubbing against the outer surface of the bracket because of the spring 78 which presses the shaft to the left. This friction makes it impossible for the toothed gear 72 to follow back when the pawl drops.

Each time that the pawl is raised, the worm 79 at the end of the shaft is turned and through this the gear 80 meshing with it. The gear 80 turns the shaft 90' carrying the drum 53 and thereby moves the paper.

The gear 80 has its outer surface pressed against the flat disc 82 which in turn is pinned to the shaft at 81 by means of a collar 83 integral with the disc 82. The gear 80 is tensioned in place by means of the spring disc 84 which is initially dished and then forced flat in assembly as the shoulder 85 of the pulley wheel 86 comes in contact with it. The wheel 86 is pinned to the shaft 90' and carries a spring belt 87, which passes over the pulley 88 for winding the paper. The wheel 86 is given a speed such that the surface speed of the roll 59 will be a little faster than the speed of the paper, but the slip is provided in the spring gear so that a slight tension only is exerted on the paper enough to keep it flat.

The paper I use is a wax coated paper such as is used generally in recording where a spark is made to puncture the paper and the heat of the spark melting away the wax around the tiny hole allows the color of the paper to become visible. In my device, however, I do not use a spark, but the marking magnet as previously described and illustrated in Figure 8.

The operation of the marking and recording element is shown diagrammatically in Figure 9. Here the sound in depth sounding or distance measurement may be received on the receiver 100 where its energy is translated into electric energy on the lines 101. The receiver 100 may be a microphone or a magnetophone. In either case the sound energy from the water impinging upon the diaphragm of the receiver will set up mechanical vibrations which will generate or vary the current in the electric circuit which includes the transformer 120 whose secondary is connected to the grid 105 to the tube 106. The receiver, if a microphone, may be supplied with direct current from the battery 102 across which is a potentiometer 103. The received energy in the transformer 104 is impressed upon the grid 105 of the tube or valve 106 and by this means the tube 107 connected thereto brings about the operation of the electromagnetic recorder whose coil 29 is in the plate circuit of the tube 107.

The circuit for operating the coil 29 is the same as that used and described in my copending application Serial No. 270,660, April 17, 1928, Patent No. 2,033,160, which also refers to my prior application Serial No. 220,719, filed September 20, 1927, issued as Patent No. 1,991,430. If both an indicator as a neon tube and the present device are to be operated from this circuit, I use two tubes in place of the tube 107, connected in parallel to the first tube 106, and operate the recording device from one tube and the neon light from the other tube, keeping thereby the plate circuit of each tube separate.

Normally a plate current is flowing in the plate circuit of the tube 107 of sufficient value to hold the armature backwards against the tension of the spring. When the armature is released as the grid of the tube 107 becomes negatively charged for an instant during the receipt of the signal the armature flies forward and makes a short stroke on the paper by removing the wax at that point. The armature is again retracted from the paper after the signal has passed, recovering somewhat slowly as explained in the copending application, above mentioned, now Patent No. 2,033,160 so that the point does not produce chattering and a series of dots on the paper. As it is usual to have an impulse of very short duration unless the proper precautions are taken, the magnet 29 may just about operate sufficiently to allow the marker to move towards the paper and retract it before an actual mark has been made, or at least before a mark of sufficient length is made, to be properly recognized. In order to overcome this difficulty the size of the condenser 121 and the resistance 122 is so regulated and chosen that while a sudden interruption of current flowing in the coil 29 occurs, the restoration of the full value of current to hold the armature in its retracted position will be somewhat delayed in taking place. This regulation is easily effected by proper choice of values of capacity in the condenser 121 and resistance in the element 122 so that the circuit will not recover its initial normal condition until some time after the impulse has occurred. This duration of time is usually chosen as covering perhaps a time interval corresponding to three or four fathoms in the measurement of the depth.

The recording magnet is provided with an air gap at all times even when retracted by means of the stop 90 so that the magnetic circuit is not worked at saturation and will collapse quickly.

In order to inform the operator when the paper is entirely used, in parallel with the coil 29, is placed an indicator 108 such as a buzzer, the circuit of which is closed when the contact arm 109 comes over a hole in the paper roll at the end thereof. At that time a contact is completed through the plate 3 and the conductor 110 and the buzzer operates continuously, or practically so, since the plate current flows except for the very short time of the signal receipt.

Having now described my invention, I claim:

1. A device to be mounted at the end of a rotating arm of a recorder and adapted to move across a flat plate bearing a recording sheet comprising a U-shaped magnet, a flat armature positioned substantially to span the pole elements of said magnet, said armature having means attached thereto and cooperating with means attached to one side of the U-shaped magnet for yieldingly positioning the armature in said position, said armature having a stylus point positioned opposite the other side of the said U-shaped magnet, said yielding means exerting an outward force from said magnet and means mounted on said magnet for retaining said armature in a limited outward position.

2. A device to be mounted at the end of a rotating arm for producing a record on a flat recording sheet across which the arm is to move comprising a magnet having two pole elements having parallel pole surfaces, an armature formed and positioned to span across said pole surfaces, spring means mounting said armature in position with a spring tension away from said pole pieces, said mounting being attached at one side of one of said pole elements adjacent the pole surface of said pole element, means applied at the other end of said armature limiting the outward motion of said armature by the action of said spring, and a stylus point mounted on said armature directly over the other of the pole surfaces.

3. In a distance measuring system by the use of compressional waves, a marking means consisting of an electromagnet and an armature having a marker thereon, amplifying means normally maintaining current in said electromagnet and capable of interrupting said current, means for receiving an impulse of compressional wave energy, means responsive to said last named means to cause said amplifying means to interrupt said current, and means operatively connected to said amplifying means for controlling the time of building up of the current after the interruption has occurred.

EDWIN E. TURNER, Jr.